Figure 1:
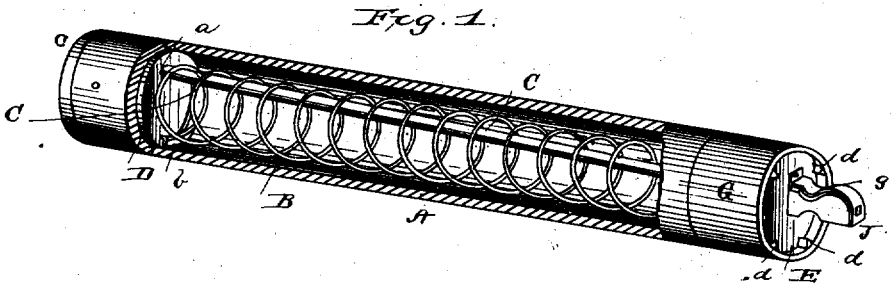

B. I. HICKS,

Assignor of one-third to S. R. SCOTTRON.

SPRING CURTAIN ROLLER.

No. 10,163. Reissued July 18, 1882.

Witnesses.

Edwin L. Yemee.

J. J. McCarthy.

Inventor.

Benjamin I. Hicks

By C. M. Alexander

Attorney.

N. PETERS, Photo-Lithographer, Washington, D. C.

UNITED STATES PATENT OFFICE.

BENJAMIN I. HICKS, OF BROOKLYN, NEW YORK, ASSIGNOR OF ONE-THIRD TO SAMUEL R. SCOTTRON, OF SAME PLACE.

SPRING CURTAIN-ROLLER.

SPECIFICATION forming part of Reissued Letters Patent No. 10,163, dated July 18, 1882.

Original No. 250,244, dated November 29, 1881. Application for reissue filed February 24, 1882.

*To all whom it may concern:*

Be it known that I, BENJAMIN I. HICKS, of Brooklyn, in the county of Kings, and in the State of New York, have invented certain new and useful Improvements in Spring-Rollers for Window-Shades; and I do hereby declare that the following is a full, clear, and exact description thereof, reference being had to the accompanying drawings, and to the letters of reference marked thereon, making a part of this specification.

This invention relates to improvements which are applicable to spring-rollers for window-shades; and it consists in the combination, with a hollow roller inclosing a helical spring, and a rod arranged eccentrically at one end of the roller, of a notched tenon and a spring-catch applied on the concentric end of the said rod, and an inside spurred cap, and also a slotted bearing formed on one of the roller-supporting brackets, all being so made and arranged that when the roller is removed from its brackets the inside helical spring will not be unwound; also, that the spring will sustain the curtain at any desired point, as will be hereinafter fully explained. This latter object is attained by means of the peculiar eccentric arrangement and movement of a spindle within the roller, and by the effect the said spindle is thereby made to have on the inclosed helical spring.

This invention, it will be perceived, consists essentially of two parts—first, of means whereby the helical spring will be prevented from unwinding when the roller is removed from its brackets, and, secondly, in the peculiar eccentric arrangement and movement of the spindle within the roller, as above indicated.

In order that the second part of my invention may be understood and distinguished from what has heretofore been done in this direction, I desire to make the following observations.

I am aware that it is not new, *per se*, to provide a spring-balance curtain-roller with an inclosed eccentrically-arranged spindle. This has been done; but in such case the spindle has a fixed position, as distinguished from a rotary travel around the axis of the roller at its eccentric end. The following is a description of this feature of my device: Within the roller proper I place a spindle bar or rod, one end whereof is passed centrally and freely through a suitable bearing in a cap rigidly fixed to one end of the roller, (the detail description of which will hereinafter more fully appear,) and the other or opposite end of said spindle is eccentrically seated and sustained in a plug, which is also rigidly secured to the roller, and which revolves with the latter.

This spindle, it will now be observed, lies in a line divergent from the axis of the roller. Also, within the said roller and around said spindle is located the helical spring, one terminus whereof has a permanent connection with the concentric end of the spindle and the other a like connection with the plug above mentioned. When the shade is drawn down the spring is caused to contract, and the free end of the spindle, which is seated in the plug, (the other end thereof being held in its bracket,) is made to revolve around the axis of the roller and impinge against the inner parts of the spring. This circular travel of the spindle around the axis of the roller, as distinguished from the fixed position of the spindle in the device above alluded to, forms the important practical difference between the two, and marks the advance I have made in the art, the result of which is the securing a continuous uninterrupted frictional contact by the impingement of the spindle against the inner wall of the spring at every point of the circle. This friction is increased or diminished according to the contraction or expansion of the spring, due to the amount of the curtain unwound from or wound upon the roller, and hence as the recoil force of the spring becomes stronger the friction becomes correspondingly greater and the weight of the distended portion of the curtain greater, thus producing a corresponding ratio in the effect of the three controlling means by which my invention is carried into effect—namely, the recoil of the spring, the friction, and the weight—resulting in a uniformity of operation at every position.

The following detail description of my invention, when taken in connection with the annexed drawings, will enable others skilled in the art to understand it.

Figure 2:
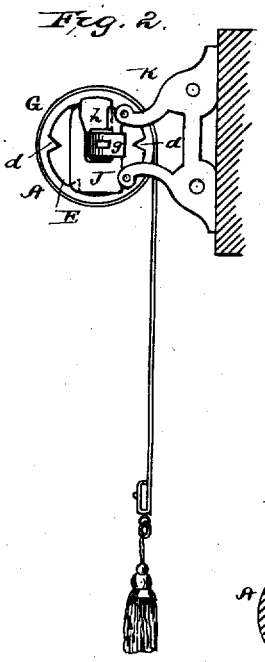

In the annexed drawings, Figure 1 is a perspective view with part of the roller broken away. Fig. 2 is a view of one end of the roller.

Figure 3:
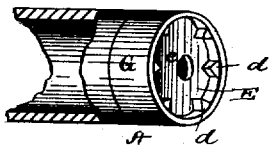
Figure 4:
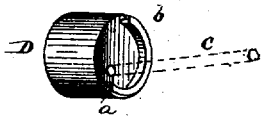
Figure 6:
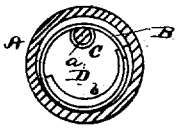
Figure 5:
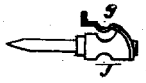

Fig. 3 is a perspective detail view of the same end of the roller. Fig. 4 is a view of the plug in one end of the roller, and Fig. 5 shows the notched tenon and its spring-catch. Fig. 6 is a cross-section of the roller.

The letter A designates the cylindrical curtain-roller, which is made hollow to receive a helical spring, B, a rod, C, and a plug, D. The plug D is rigidly secured in one end of the roller, and in its inner end a hole, *a*, is made eccentric to its longitudinal axis to receive the end of the rod C, as shown in Figs. 1 and 4. This plug D has a groove, *b*, in its periphery for facilitating the attachment to the plug of one end of the helical spring B. The end of the rod C is free to turn in the hole *a*, so as to prevent binding when the plug is rotated. The plug and its end of the roller are covered by a metal cap, *c*, from the center of which projects a journal for supporting the roller in one of its brackets. At the opposite end of the roller a cap, E, is fixed to it, and held in place by means of a ferrule, G. This cap E has a depression in its end, surrounded by spurs *d*, equidistantly arranged at suitable distances apart. A hole, *e*, is made centrally through the cap E, through which passes freely the neck of a tenon, J, which is rigidly secured into the concentric end of the rod C. The outer or exposed tenon, J, is notched on opposite sides, as shown clearly in Figs. 1 and 5, and to this tenon a spring-catch, *g*, is secured, the free end of which is adapted to spring out and engage with one or the other of the spurs *d*, thereby preventing the roller A or rod C from turning one on the other. The bracket K, which supports this tenoned end of the roller, is constructed with a slotted receptacle, *h*, the upper end of which is flaring, as shown in Fig. 2. When the tenon J is supported in this notched portion of the bracket the sides of the slot receive the notches in the tenon and prevent the rod C from turning with the roller, but allow the roller A to turn on this rod. The spring-catch *g* is so formed relatively to the tenon J that when the latter is in its bearing *h* this catch will be compressed and held free from the spurs *d*, but instantly the tenon is removed from its bearing *h* the spring-catch will engage the tenon, and of course the rod C, with the spurs, and prevent the spring B, which is secured to rod C near cap E, from unwinding. Now, the rod C being held against any rotation upon its own axis, and being free at the other end (in the plug D) to rotate about the axis of the roller, it impinges against the inner parts of the spring B. The friction thereby caused is increased or diminished according as the shade may be moved up and down. On the instant the hand is applied to the curtain to move it and its weight is relieved from the spring B this spring will coil up, carrying the shade upward without any jarring noise or irregular motion. It will be observed that the few parts of which my roller attachment is composed are simple, cheap, and readily put together.

Having described my invention, I claim—

1. The combination, in a curtain-roller, of the spring, the rod, the spurred cap, the notched tenon, the spring-cap, and the peculiarly-slotted bearing *h* of the bracket-support, substantially as described.

2. The combination, with a shade, of a shade-roller inclosing a spindle concentrically arranged within said roller at one end and eccentrically seated therein at the other, the latter end being adapted to travel around the axis of the roller, and a spring secured respectively to the spindle and the roller, substantially as herein specified.

3. The combination, with a shade, of a shade-roller inclosing an eccentrically-bored plug, a spindle concentrically arranged within the shade-roller at one end and eccentrically seated within the aforesaid plug at the other end, and thus adapted to travel around the axis of the roller, also a spring secured respectively to the spindle and the roller, substantially as herein specified.

BENJ. I. HICKS.

Witnesses:
J. J. McCarthy,
M. L. Stowell.